US011754581B2

(12) United States Patent
Feyrer

(10) Patent No.: US 11,754,581 B2
(45) Date of Patent: Sep. 12, 2023

(54) POSITIONING SYSTEM FOR POSITIONING END EFFECTORS

(71) Applicant: Festo SE & Co. KG, Esslingen (DE)

(72) Inventor: Thomas Feyrer, Esslingen (DE)

(73) Assignee: Festo SE & Co. KG, Esslingen (DE)

( * ) Notice: Subject to any disclaimer, the term of this patent is extended or adjusted under 35 U.S.C. 154(b) by 50 days.

(21) Appl. No.: 17/615,356

(22) PCT Filed: Nov. 25, 2020

(86) PCT No.: PCT/EP2020/083305
§ 371 (c)(1),
(2) Date: Nov. 30, 2021

(87) PCT Pub. No.: WO2021/144057
PCT Pub. Date: Jul. 22, 2021

(65) Prior Publication Data

US 2022/0229080 A1 Jul. 21, 2022

(30) Foreign Application Priority Data

Jan. 13, 2020 (DE) ........................ 102020200295.9

(51) Int. Cl.
*G01N 35/10* (2006.01)
*G01N 35/04* (2006.01)
*B01L 3/02* (2006.01)

(52) U.S. Cl.
CPC ........ *G01N 35/1072* (2013.01); *B01L 3/0227* (2013.01); *G01N 35/04* (2013.01); *G01N 2035/1076* (2013.01)

(58) Field of Classification Search
None
See application file for complete search history.

(56) References Cited

U.S. PATENT DOCUMENTS 9,101,922 B2 8/2015 D'Amore et al.
2013/0233096 A1* 9/2013 Schlegel ............ G01N 35/1072 73/864.11
2020/0298242 A1* 9/2020 Romer ............... G01N 35/1072

FOREIGN PATENT DOCUMENTS

DE 19815400 10/1999
DE 19815400 A1 10/1999
DE 102005049920 4/2007
DE 102005049920 A1 4/2007
(Continued)

*Primary Examiner* — P. Kathryn Wright
(74) *Attorney, Agent, or Firm* — Hoffmann & Baron, LLP

(57) ABSTRACT

A positioning system (1) that has a system main part (4), on which multiple working units (6) are arranged next to one another in the axial direction of a y-axis, said working units being linearly movable, thereby carrying out a working movement (8) in the axial direction of a z-axis. Each working unit (6) is paired with a dedicated drive unit (7) in order to be actuated, said drive unit having a stator (23) attached to the system main part (4) and an output element (24) drivingly connected to the working unit (6) via a coupling section (26). The stators (23) are distributed into multiple stator rows (58) which are aligned in the axial direction of the y-axis and are arranged one behind the other in the axial direction of the x-axis, wherein the stators (23) of each pair of adjacent stator rows (58) are offset to one another with a mutual overlap in the axial direction of the y-axis.

16 Claims, 6 Drawing Sheets

(56) References Cited

FOREIGN PATENT DOCUMENTS

| | | | | |
|---|---|---|---|---|
| DE | 102012015083 | | 8/2013 | |
| DE | 102012015083 | B3 | 8/2013 | |
| DE | 102014013552 | | 5/2015 | |
| DE | 102014013552 | B3 | 5/2015 | |
| DE | 102014108688 | A1 * | 12/2015 | ......... G01N 35/0099 |
| DE | 102017220892 | A1 * | 5/2019 | .............. B01L 3/021 |
| WO | 2006000115 | A1 | 1/2006 | |
| WO | WO 2006000115 | | 1/2006 | |

* cited by examiner 1,1a
17
18
VIII
5
6
10,10a
36
44
4
63
64
23
23a
6562
652363
58
22
y
x
7
2
62
45a

POSITIONING SYSTEM FOR POSITIONING END EFFECTORS

This is a National Stage application based on International Application No. PCT/EP2020/083305, filed on Nov. 25, 2020, which claims priority to DE 102020200295.9, filed Jan. 13, 2020.

BACKGROUND OF THE INVENTION

The invention relates to a positioning system for positioning end effectors, with a system main body, on which several working units are arranged next to one another in the axis direction of the y-axis of an x-y-z coordinate system, said working units whilst carrying out a working movement being linearly movable in the axis direction of a z-axis which is orthogonal to the y-axis for the positioning of an end effector which is respectively arranged on them.

DE 10 2014 013 552 B3 describes a such a positioning system which is designed as a metering system and concerning whose end effectors it is the case of metering units with which fluid quantities can be received from carrier substrates or can be delivered into carrier substrates. In particular, the fluid quantities are fluid samples, for example biochemical analysis samples which are to be analysed or treated in any other manner, or nutrient solutions or reagents of different types. The end effectors are assembled on working units of the positioning system, wherein the working units are linearly movable in the axis direction of a z-axis which as a rule is orientated vertically, in order to position the metering units in the necessary relative positions with respect to an assigned carrier substrate. Concerning the known positioning system, the working units always execute their working movements in a synchronous manner, since they are fixedly attached to a system main body, wherein the system main body is movable, in order to create the working movement of the working units including the end effectors which are attached thereto.

The exclusively unitary positionability of the working units and of the end effectors which are attached thereto, although permitting an inexpensive construction with regard to drive technology, however has the effect of a certain limitation in practical application.

WO 2006/000 115 A1 discloses a device for arranging pipetting or dispensing syringes in a system for handling liquid samples. The device has a robot arm, on which several blocks are movably arranged, these each being equipped with several pipetting or dispensing syringes. The pipetting or dispensing syringes are each individually vertically movable relative to the block which carries them.

A pipetting device which is equipped with pipetting units which are movable independently of one another is known from U.S. Pat. No. 9,101,922 B2.

DE 10 2012 015 083 B3 describes a dispensing head for dispensing fluid samples, which is equipped with several individual displaceable dispensers.

SUMMARY OF THE INVENTION

It is the object of the invention to create a positioning system which given a compact construction provides a high variability with regard to the positionability of the end effectors.

For achieving this object, in combination with the initially mentioned features, one envisages the working units being able to execute their working movements independently of one another and relative to the system main body, wherein an individual drive unit is assigned to each working unit for generating its working movement, wherein the drive units are arranged next to one another in the axis direction of the y-axis, furthermore the drive units each comprising a stator which is stationary with respect to the system main body, and a driven body which is actively moveable with respect to the stator whilst carrying out a driven movement, wherein the driven body is drivingly coupled to the assigned working unit via a coupling section for creating the working movement, and the stators being arranged in a distributed manner in several stator rows which are successive in the axis direction of the x-axis and are aligned in the axis direction of the y-axis, wherein the stators of the stator rows which are respectively adjacent in the axis direction of the x-axis are arranged offset to one another in the axis direction of the y-axis with a mutual overlapping.

A positioning system which is designed in this manner permits a positioning of present end effectors in the axis direction of the z-axis independently of one another, since the working units which on operation of the positioning system are equipped with the end effectors can be displaced relative to the system main body independently of one another for executing their working movements and are each coupled to an individual drive unit for generating their working movements. The working units can therefore be moved in a selective manner for example individually, sequentially or in groups or all together and be positioned as desired. This entails a very broad spectrum of application. Each drive unit has a stator which is fixed in a stationary manner with respect to the system main body, and a driven body which is drivable with respect to this into a driven movement, wherein the driven body is connected to the assigned working unit via a coupling section, so that a working movement of the assigned working unit can be taken from the driven movement of the driven body. Preferably, the drive units are of an electrically actuatable type, which permits very precise positionings with a low effort, but the drive concept can also for example be a fluidic and in particular a pneumatic drive concept. A very significant aspect lies in a surfaced distribution of the stators of the individual drive units, so that the stators of the present drive units do not all lie in one row, but are divided on to several linear rows which are denoted as stator rows and which extend in the axis direction of the y-axis and are arranged successively in the axis direction of the x-axis. The stators are each placed within these stator rows such that the stators of stator rows which are each adjacent in the axis direction of the x-axis are offset to one another in the axis direction of the y-axis, wherein the offset is selected such that the stators overlap in the axis direction of the y-axis. If one considers two arbitrary stators which are arranged next to one another in one and the same stator row, then one stator of the stator row which is adjacent in the axis direction of the y-axis is placed offset in the axis direction of the y-axis in a manner such that it overlaps with at least one and in particular with both aforementioned stators of the first mentioned stator row. Considering the fact that the stators usually have a greater width than the assigned coupling sections and working units, this provides the advantage that the working units can be placed tightly next to one another without being restricted by the stators. This produces particularly advantageous effects in the case of a positioning system which is conceived as a metering system and is used in order to fill or to empty carrier substrates which have receiver deepenings which are arranged very closely next to one another, as is regularly the case with so-called micro-titration plates. Nevertheless, the positioning system can also be used in a different manner, for example for handling objects if the end effectors are gripping units, for example vacuum gripping units.

Advantageous further developments of the invention are to be derived from the dependent claims.

As already mentioned, the positioning system can play out its advantages in a particularly convincing manner given a design as a metering system concerning which the end effectors are formed by metering units. Due to the movement and positioning of the working units which are provided with the metering units, said movement and positioning being independent of one another, fluid quantities in a metered manner can be received from a carrier substrate and/or be delivered into a carrier substrate, depending on the type of metering units, and specifically with a very high variability. If for example a micro-titration plate is placed below the metering units, then given a selective actuation of the working units, a selective metering with respect to receiver deepenings which are formed in a carrier substrate is possible.

The drive units are expediently grouped together in a compact space in a region of the stator main body which is denoted as a drive zone. The drive zone can be arranged for example adjacently to the working units in the axis direction of the z-axis, wherein they are located above the working units given a vertical z-axis. However, a spatial arrangement concerning which the drive zone is placed adjacently to the working units in the axis direction of the x-axis it is seen as being particularly favourable, wherein it is expedient of the x-axis is aligned horizontally. If one denotes that region in which the working units are situated as a working zone, then the drive zone and the working zone expediently lie next to one another in the axis direction of the x-axis, wherein an overlapping is indeed possible.

The coupling sections which ensure the drive-coupling of the drive bodies to the working units expediently extend in a region which is distanced with respect to the assigned stator in the axis direction of the z-axis. Herein, the coupling sections in the axis direction of the y-axis have a smaller width than the respectively assigned stator, which likewise applies to the working units which are coupled to the coupling sections. This design is particularly advantageous in combination with an arrangement of the drive zone and of the working zone which is adjacent to one another in the axis direction of the x-axis. In this case, the coupling sections of those drive units whose stators belong to a rear stator row, in front of which rear stator row the at least one stator row is arranged at the side which faces the working units, can extend past the stators of the at least one stator row which is arranged in front, at a distance with is measured in the axis direction of the x-axis, in order to be coupled to the assigned working unit.

Stators which belong to the same stator row can indeed bear on one another in the axis direction of the y-axis, but are preferably arranged distanced to one another. Expediently, the greater the number of existing stator rows, the larger is the distance between the stators which lie in the same stator row, said distance being present in the axis direction of the y-axis, wherein the distance however is preferably smaller than the width of each stator which is measured in the axis direction of the y-axis.

A particularly good ratio between the existing number of working units and compactness of the positioning system results if the stators are arranged in three and expediently in exactly three stator rows which are successive in the axis direction of the x-axis.

Stator rows which are adjacent in the axis direction of the x-axis can comprise a number of stators which is identical amongst one another, but however can also have a number of stators which is different from one another. By way of example, each stator row comprises three stators or four stators. Likewise for example, of consecutive stator rows, the respective one stator row has three stators and the respective other row only two stators.

Expediently, the stators together with all drive units are designed identically amongst one another.

It is further advantageous if all stators are placed at the same height in the axis direction of the z-axis in a common stator plane which is orthogonal to the z-axis.

A particularly favourable distribution of the stators has been found to result if the stators are placed such that when considered in the axis direction of the z-axis, several stator groups result, said stator groups each being composed of several stators which belong to stator rows which are successive in the axis direction of the x-axis and whose centre regions lie at least essentially on a connection straight line which is inclined with respect to the x-axis, wherein the connection straight lines of the several stator groups run parallel to one another. Preferably, the connection straight lines are inclined at an angle of 45 degrees with respect to the x-axis.

A particularly expedient design of the stators envisages an at least essentially square outline considered in the axis direction of the z-axis, wherein the outlines of all stators amongst one another are preferably identical amongst one another. Basically however, other stator outlines, for example round outlines are also possible.

The individual coupling sections in principle can be designed integrally with the respectively assigned driven body. This for example is when the driven body is a driven rod which is designed in the manner of a piston rod whose driven movement is a linear movement and whose end section functions as a coupling section. Basically however, it is seen as being more advantageous if each coupling section is designed separately with respect to the assigned driven body and with regard to drive is connected to the coupling section via suitable measures. A coupling section which is designed separately with respect to the driven body, with regard to drive can be connected to the driven body in a manner such that it either participates in the driven movement of the driven body or is driven by the driven movement of the driven body into a relative movement with respect to this.

It has been found to be particularly expedient if each coupling section is designed as a coupling slide which is displaceable with respect to the system main body. Each coupling slide is displaceably mounted on the system main body in the axis direction of the z-axis, wherein it is preferably the case of a displacement mounting which is independent of the driven bodies. The coupling slide is preferably designed in a plate-like manner and is aligned such that its plate plane runs orthogonally to the y-axis. This permits a very narrow construction width of the positioning system in the axis direction of the y-axis.

Each working unit expediently comprises a guide rod which is aligned parallel to the z-axis, is movable in the axis direction of the z-axis, is fastened to the coupling section of the assigned drive unit and is mounted on the system main body in a lineally displaceable manner. An assembly interface which serves for the attachment of an end effector and to which an application-specific end effector is fastened on operation of the positioning system is formed on the guide rod. The fastening can be effected in a direct manner or by way of a holder which is adapted the end effector and which can function as an adapter.

The guide rods of all working units are preferably arranged in a manner such that their longitudinal axes lie in a common plane which is denoted as a guide rod plane and runs orthogonally to the x-axis.

A preferred construction of the system main body envisages two carrier plates which each extend in a plane which is orthogonal to the z-axis and are arranged distanced to one another in the axis direction of the z-axis, so that they delimit an intermediate space which is to be denoted as a coupling space, since the coupling sections of the working units are located therein.

The two carrier plates are preferably held at a distance by way of a support structure which is integrated between them, wherein this support structure in particular is formed by side walls of the system main body which delimit the coupling space at the sides which are orientated at right angles to the z-axis. Each guide rod is placed such that it passes through both carrier plates and bridges the distance which is present between the carrier plates, wherein it is mounted in each carrier plate in a linearly displaceable manner in its longitudinal direction. Preferably, the stators of all drive units are fastened to one and the same of these two carrier plates.

It is advantageous if each drive unit comprises an individual drive module which comprises one of the stators and one of the driven bodies. On assembly of the positioning system, the drive modules can be handled independently of one another. The stator preferably represents a module housing of the drive module which defines the outer appearance of the drive module and via which the stator is fastened to the system main body.

The drive units are expediently electrical drive units, wherein the drive modules are designed as electrical drive modules. The electrical drive modules convert the fed electrical energy into a driven movement of the driven body. Preferably, the electrical drive modules are electric motors, in particular stepper motors, so that a very precise control which is closed-loop controlled in position is possible. Basically, the drive modules can however also be designed as fluid-actuated drive modules, for example as pneumatic drive modules and herein in particular as linear drives, for example pneumatic cylinders.

The driven body of each drive unit is expediently designed in a rod-like manner and is aligned such that its longitudinal axis runs in the axis direction of the z-axis. In this case, the rod-shaped driven bodies are aligned parallel to the possibly present guide rods of the drive units. Preferably, the rod-like driven body and the guide rod which belong to one and the same drive unit lie in a plane which is at right angles to the y-axis.

A particularly exact positioning of the working units is possible if the rod-like driven body of each drive unit can be driven into a rotational driven movement about its longitudinal axis. The driven body is in threaded engagement with the assigned coupling section, so that the rotational driven movement of the driven body results in a linear movement of the coupling section which is orientated in the axis direction of the z-axis and which creates an equally directed linear working movement of the working unit which is attached to the coupling section. The rod-like driven body in the region which interacts with the coupling section is expediently designed as a threaded spindle which has an outer thread. The coupling section expediently has a spindle nut with an inner thread, into which the threaded spindle of the driven body is screwed.

Expediently, each coupling section has several receiver structures which are distanced to one another in the axis direction of the x-axis, for the selective receiving of a spindle nut. This permits the use of identically designed coupling sections for the various drive units, independently of the stator row, in which the assigned stator is placed.

BRIEF DESCRIPTION OF THE DRAWINGS

The invention is hereinafter explained in more detail by way of the accompanying drawing. In this are shown in.

DETAILED DESCRIPTION

Figure 2:
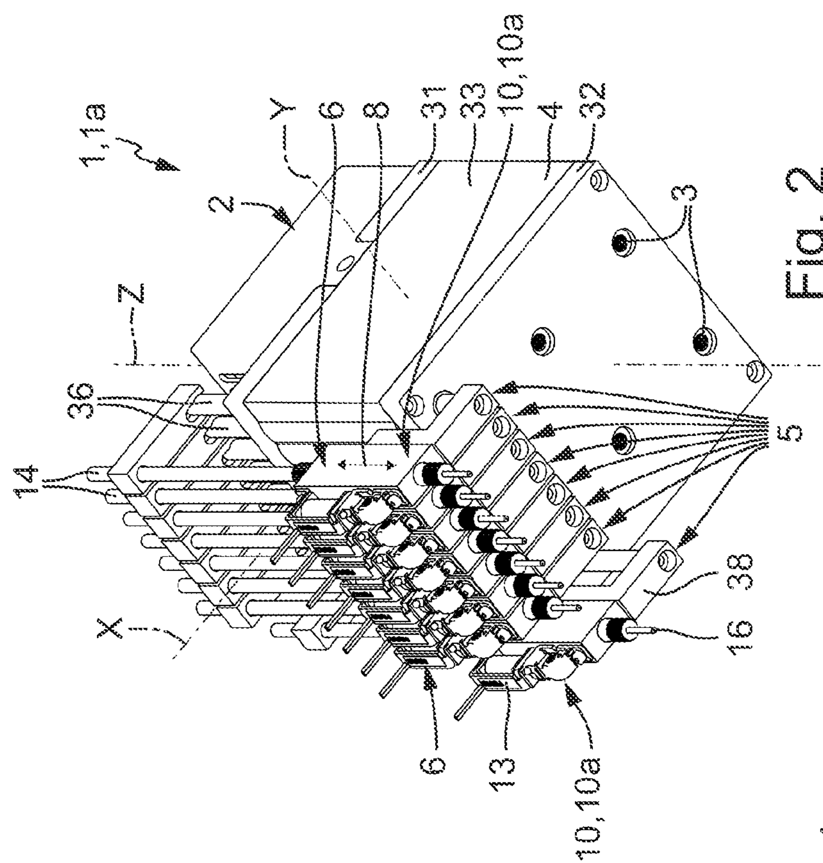
Figure 1:
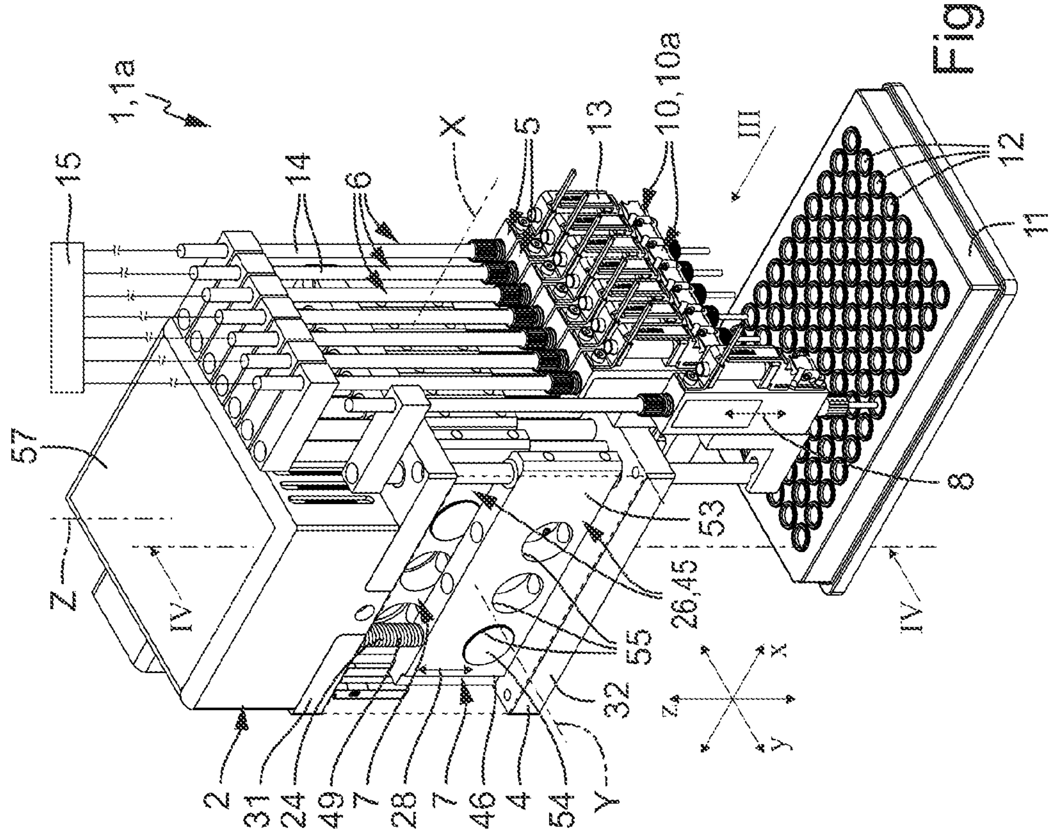
FIG. 1 a preferred embodiment of the positioning system according to the invention in a design as a metering system which is suitable for receiving and/or delivering fluid quantities, in a perspective view, wherein a carrier substrate which is to be processed by the positioning system is also shown, FIG. 2 the positioning system of FIG. 1 from a different viewing direction, again in a perspective representation, FIG. 3 a front view of the positioning system with a viewing direction according to arrow III of FIG. 1, FIG. 4 a longitudinal section of the positioning system according to the section line IV-IV of FIGS. 1, 3 and 6, FIG. 5 a cross section of the positioning system according to the section line V-V of FIG. 4, FIG. 6 a further cross section of the positioning system according to the section line VI-VI of FIG. 4, FIG. 7 a further longitudinal section of the positioning system according to section line VII-VII of FIG. 4, FIG. 8 an individual representation of one of the several positioning units which are contained in the positioning system and which are each composed of a drive unit and of a working unit, and specifically in the state of the working unit in which it is equipped with an end effector and according to the detail VIII which is framed in FIG. 5 in a dot-dashed manner, and FIG. 9 in a perspective representation, a detail of a further embodiment of the positioning system which differing from the embodiment example of FIGS. 1 to 8 comprises an equal number of stators within the individual stator rows, wherein only the drive units and the working units which are attached thereto are shown for the purpose of a better overview.

The positioning system which as a whole is given the reference numeral 1 has a system main unit 2 which can be placed at the location of application and which expediently comprises at least one fastening interface 3, via which it can be fixed to a carrier structure which is not illustrated further. This carrier structure can be designed in a stationary manner and for example as a support frame. The support structure can also be a handling unit, with whose help the system main unit 2 can be moved in space.

Figure 8:
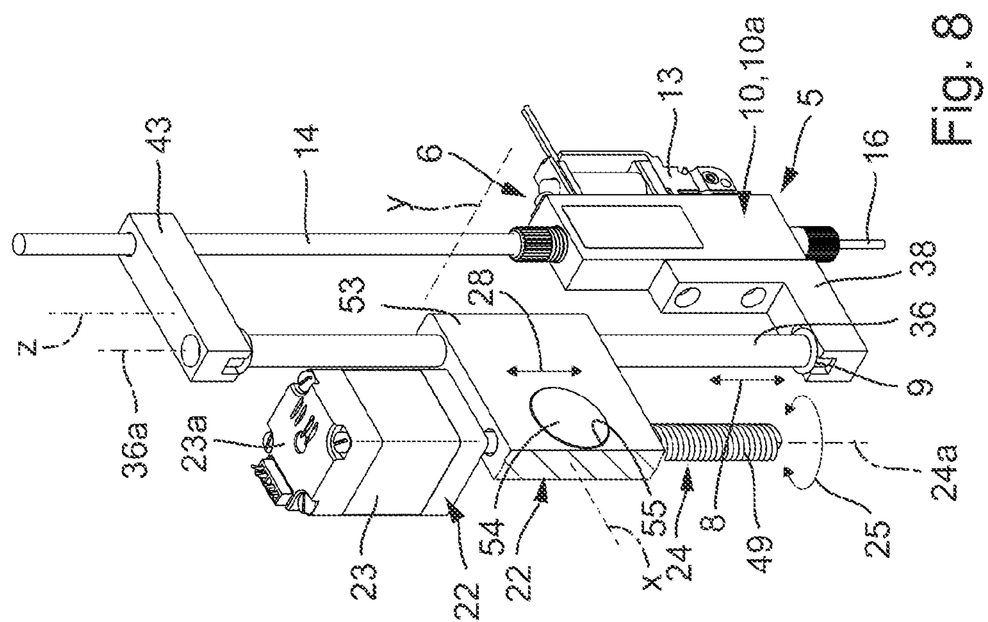

The system main unit 2 has a system main body 4 and a plurality of positioning units 5 which are arranged on the system main body 4. Such a positioning unit 5 is represented individually in FIG. 8. Each positioning unit 5 comprises a working unit 6 and a drive unit 7 which with regard to drive is coupled to the working unit 6. By way of the drive unit 7, the working unit 6 can be driven into a linear working movement 8 which is indicated by a double arrow.

An assembly interface 9 for an end effector 10 is located on the drive unit 7. On operation of the positioning system, an end effector 10 which is matched to the positioning task is attached to the assembly interface 9, so that it participates in the working movement 8. The end effector 10 can be an integral constituent of the working unit 6.

In the course of the working movement 8, each working unit 6 and the end effector 10 which is assigned to it can not only be moved linearly but can also be positioned if required, which is to say can be fixedly held for a while at a desired location of the displacement path.

The positioning system 1 can be designed and used for a variety of purposes. For example, it is suitable for handling measures, in which case the end effectors 10 are designed as grippers and in particular as vacuum grippers, with which objects can be gripped and firmly held during relocation.

A preferred field of application of the positioning system 1 however is the metering of fluid quantities, in particular in the field of medical technology, in the pharmaceutical field and/or concerning arbitrary biological or biochemical measures. The fluid quantities which are to be metered here are mostly denoted as fluid samples. The illustrated positioning system 2 is designed for such an application case, so that it represents a metering system 1*a*. The end effectors 10 of the individual positioning units 5 in this case are each designed as a metering unit 10*a* which is capable of receiving a certain fluid quantity or fluid sample and of also delivering it again.

Fluid quantities which are to be received are regularly made available in a matrix-type distribution with a suitably constructed carrier substrate 11, wherein such a carrier substrate 11 in particular is a so-called micro-titration plate. The carrier substrate 11 has a multitude of receiving deepenings 12, in which each of which a fluid quantity can be provided. The fluid quantities can be removed from the receiver deepenings 12 with the help of the metering units 10*a* and be subjected to a subsequent treatment, for example an analysis. The metering system 1*a* however can also be used to deliver treated or untreated fluid quantities into the receiver deepenings 12 of such a carrier substrate 11 for storage or for further treatment. In this case, the metering units 10*a* expediently each comprise a metering valve 13 which is the case with the illustrated embodiment example. The fluid to be metered is fed to the respective metering valve 13 via a fluid conduit 14 which is connected thereto and concerning which are a rigid pipe conduit and/or a flexible tube conduit. By way of example, the metering valves 13 are connected via fluid conduits 14 to a fluid store 15 which provides the fluid to be metered.

With reference to a Cartesian x-y-z coordinate system, the system main unit 2 has spatial extensions in the axis direction of an x-axis, of a y-axis which is at right angles to the x-axis and of a z-axis which is at right angles to the x-axis and well as the y-axis. Directions which run in the axis direction of one of these Cartesian axes are hereinafter also only denoted as x-axis direction, y-axis direction and z-axis direction for simplification.

Concerning a common operationally ready spatial alignment of the system main unit 2, the z-axis direction runs vertically, whereas the x-axis direction and the y-axis direction each run horizontally. This particularly applies to a metering system 1*a*.

Each metering unit 10*a* at one end has a metering opening 16 which for example is defined by a pipette or by a syringe needle and which by way of example points downwards in the z-axis direction. For receiving and/or delivering a fluid quantity, the carrier substrate 11 is positioned below the metering units 10*a* such that each metering opening 16 comes to lie above one of the receiver deepenings 12. The metering units 10 are immersed with their metering openings 16 into the receiver deepenings 12 and also moved out again by way of the working movement 8 which is orientated in the z-direction.

The working units 6 which are provided by way of example with the metering units 10*a* are present in multiple for the purpose of a rational operating manner, so that if necessary a plurality of receiver deepenings 12 can be filled or emptied simultaneously. The several working units 7 are arranged next to one another in the y-axis direction. Accordingly, the metering openings 16 lie in an opening row which follows in the y-axis direction.

Since the receiver deepenings 12 in the case of the illustrated application example are relatively small and are arranged next to one another in a tight raster, the metering openings 16*a* of the metering units 10 must also lie tightly next to one another. This by way of example can be ensured without any problem by way of a correspondingly narrow design of the metering units 10*a* and all of the working units 6 in the y-axis direction. The multitude of working unit 6 can be arranged next to one another in the y-axis direction in the tightest of spaces.

An advantage of the positioning system 1 according to the invention lies in the fact that the system main unit 2 can also be realised with small dimensions in the y-axis direction in the region of the drive units 7, so that the system main unit 2 as a whole has very compact dimensions in the y-axis direction. This encourages an application given restricted spatial conditions and a multiple arrangement of system main units 2 in a tight space.

The positioning units 5 which each comprise a drive unit 7 and a working unit 6 are arranged on the system main body 4 lying next to one another in the y-axis direction. The working unit 6 and the drive unit 7 are arranged successively in the x-direction within the respective positioning unit 5. As a whole, by way of example an arrangement concerning which all working units 6 lie in a region which is denoted as a working zone 17 and all drive units 7 lie in a region which is denoted as a drive zone 18 results from this, wherein the working zone 17 and the drive zone 18 are arranged successively in the x-axis direction. The drive zone 18 expediently lies at essentially the same height as the working zone 17 in the z-axis direction.

The working units 6 can execute their working movements 8 relative to the system main body 4 and independently of one another. The system main body 4 as a result can consequently retains its spatial position in an unchanged manner given working movements of the working units 6. For this reason, only small masses need to be moved, in order to displace the end effectors 10 in the z-axis direction and to position them.

Since an individual drive unit 7 is assigned to each working unit 6, the end effectors 10 can be moved independently of one another. The positioning system 1 expediently comprises an electronic control device 19 which is electrically connected to the individual drive units 7 and which permits an individual electrical control of the drive units 7. By way of example, the electronic control device 19 can initiate only individual working units 6 into being moved in a defined sequence, the working units being moved in groups or all working units 6 being moved.

Each drive unit preferably comprises a drive module 22 which comprises a stator 23 and a driven body 24 which can be driven with respect to this into a driven movement 25. Particularly advantageous is the use of electrical drive modules 22 which by way of example is the case. Here, fed electrical energy is converted directly into movement energy of the driven body 24. Basically however, fluid-actuated drive modules 22 can also be applied.

Preferably and according to the example, each drive module 22 is formed by an electric motor, concerning which it is particularly a stepper motor with a driven shaft 66 which belongs to the driven body 24 and which with regard to rotation angle can be positioned in a very precise manner.

The driven movement 25 of the driven body 24 which is produced by the drive module 22 is preferably a rotation movement which is the case with the illustrated embodiment examples. The driven body 24 is herein designed in a rod-like manner and has a longitudinal axis 24*a* which forms the rotation axis for the rotational driven movement 25. The drive modules 22 in particular are installed such that the longitudinal axes 24*a* of the driven bodies 24 are aligned in the z-axis direction. Accordingly, the longitudinal axes 24*a* of the driven bodies 24 coincide with the movement direction of the working movement 8.

The drive modules 22 are electrically connected to the electronic control device 19, from which they receive electrical control signals, by way of which the driven movement 25 of its driven body 24 can be created for moving and positioning the working units 6.

The drive modules 22 are each fastened to the system main body 4 via their stator 23, so that they are stationary with respect to this. By way of example, each stator 23 defines a module housing 23*a* which is fixed to the system main body 4 by way of fastening screws which are not illustrated further.

The drive unit 7 of each positioning unit 5 comprises a coupling section 26 for drive-coupling of the driven body 24 to the working unit 6. The coupling section 26 is fastened to the working unit 6 via a fastening device 27, so that these two constituents always can only be moved together. The coupling section 26 can execute a to and fro linear movement 28 relative to the system main body 4 in the z-axis direction. This linear movement 28 can be created by way of the interaction with the driven body 24. Its driven movement 25 creates the linear movement 28 of the coupling section 26, which results in a simultaneous execution of the working movement 8 by the working unit 6.

Figure 4:
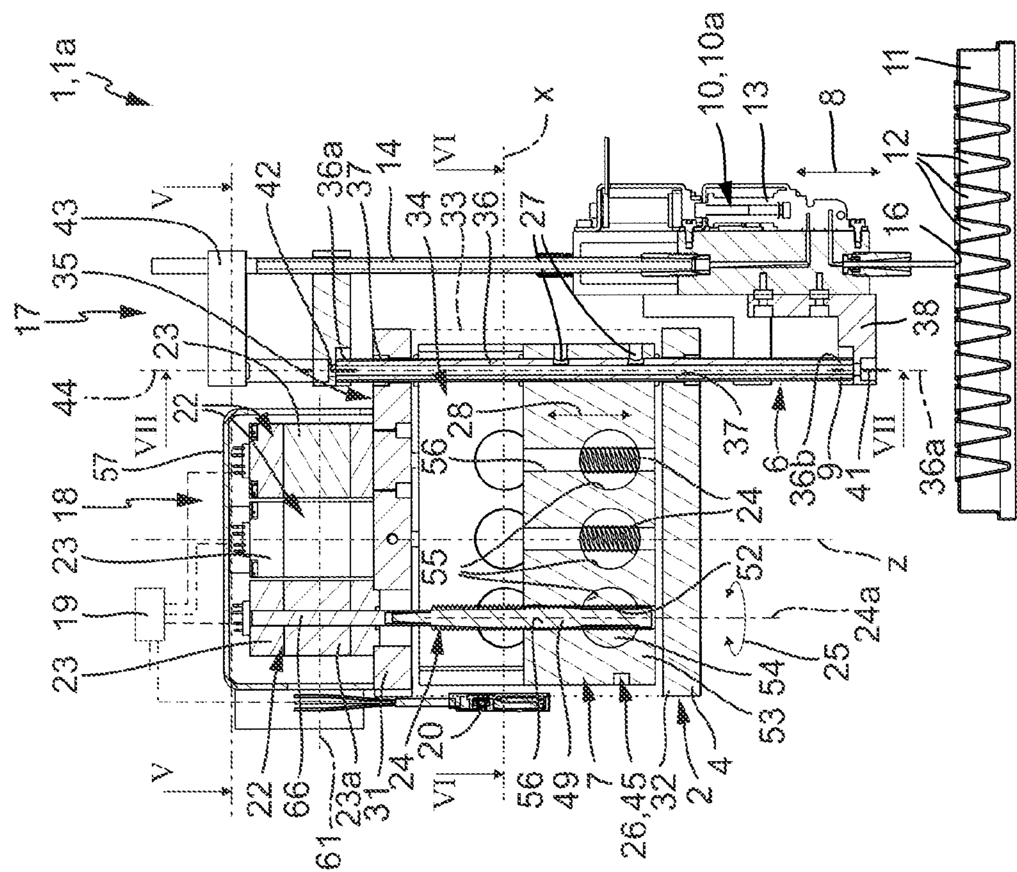
Figure 3:
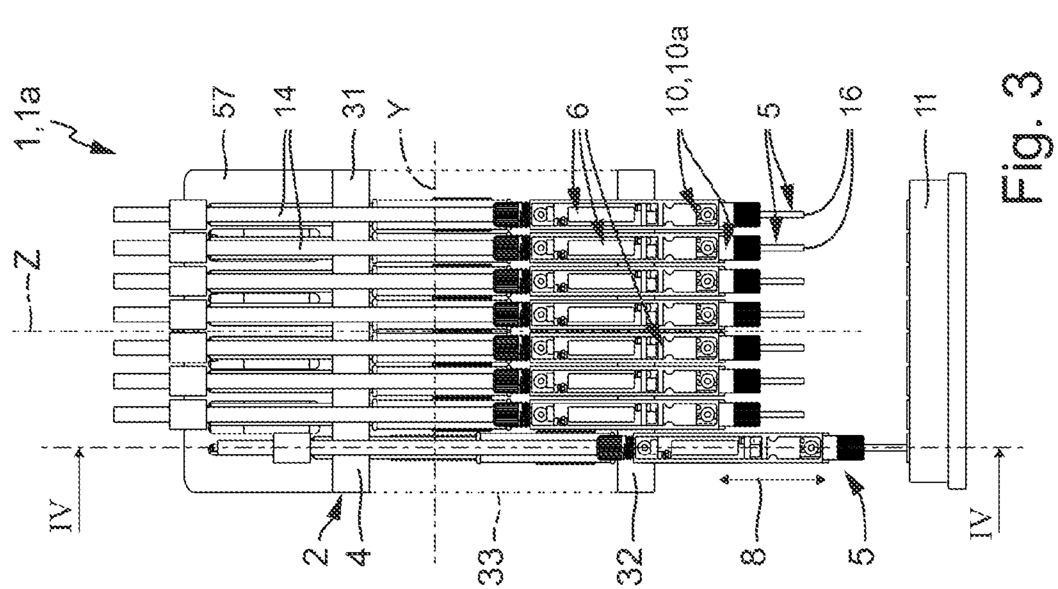

Expediently, a position sensor 20 by way of which the current position of the assigned working unit 6 can be detected in a direct or indirect manner is assigned to each positioning unit 5. The position sensors 20 provide electrical position signals which are fed to the electronic control device 19, to which according to FIG. 4 all position sensors 20 are electrically connected. An actuation of the working units 6 which is closed-loop controlled in position is possible by way of this.

The positioning units 5 by way of example are carried by two first and second carrier plates 31, 32 of the system main body 4 which are arranged distanced to one another in the axis direction of the z-axis. Each carrier plate 31, 32 has a rigid structure and extends in a plane which is orthogonal to the z-axis. In the advantageous vertical alignment of the z-axis which is realised by way of example, the first carrier plate 31 lies at a distance above the second carrier plate 32. Side walls 33 of the system main body 4 which are integrated between these two carrier plates 31, 32 and to which the carrier plates 31, 32 are fastened set the distance which is present between the two carrier plates 31, 32.

The two carrier plates 31, 32 commonly delimit an intermediate space, in which all coupling sections 26 are arranged and which is therefore denoted as a coupling space 34.

Together with the side walls 33, the two carrier plates 31, 32 form a housing structure expediently with a cubic outer contour.

A front side wall 33*a* which is assigned to the transition region between the working zone 17 and the drive zone 18, and a rear side wall 33*b* which lies opposite the front side wall 33*a* in the x-axis direction are located below the side walls 33. Two lateral side walls 33*c*, 33*d* which lies opposite one another in the y-axis direction extend therebetween. The front side wall 33*a* and the two lateral side walls 33*c* 33*d* are expediently grouped together into a single-piece wall structure, onto which the rear side wall 33*b* is applied in the manner of a lid and in particular in a releasable manner.

The stators 23 of all drive units 7 are expediently fastened to one and the same carrier plate 31 or 32, wherein in particular and by way of example this is the first carrier plate 31. The stators 23 are seated on an equipping surface 35 of the first carrier plate 31 which is away from the coupling space 34, so that by way of example they project upwards from the first carrier plate 31. In particular, the fastening is effected via the module housing 23*a*.

The rod-like driven bodies 24 project through openings of the first carrier plates 31 into the coupling space 34, by way of example from above.

Each working unit 6 expediently has a guide rod 36 which is aligned in the z-axis direction and is movable in the z-axis direction relative to the system main body 4 for carrying out the working movement 8. The longitudinal axis 36*a* of each guide rod 36 runs in the z-axis direction and is consequently parallel to the longitudinal axis 24*a* of the driven body 24 which belongs to the same positioning unit 5.

Each guide rod 36 is mounted on the system main body 4 in a linearly displaceable manner in its longitudinal direction and accordingly in the z-axis direction. By way of example, a displacement mounting is effected at two locations, specifically on each of the two carrier plates 31, 32. Each guide rod 36 is placed such that it passes through both carrier plates 31, 32, wherein it passes through the coupling space 34 in the z-axis direction and with two first and second rod end sections 36*b*, 36*c* which are opposite one another projects beyond the respectively assigned carrier plate 31, 32 at the outer side which is opposite to the coupling space 24. The openings of the carrier plates 31, 32, through which the guide rod 36 passes are designed as guide openings 37 which have a guide surface which guides in a slidingly displaceable manner and which radially supports the guide rod 36. The guide surface can be formed by a guide bush which is inserted into the guide opening 37.

The guide rods 36 at the outside in particular are contoured in a circularly cylindrical manner, which accordingly also applies to the inner periphery of the guide openings 37. By way of example, the guide rods 36 are designed in a tubular manner, by which means the manufacturing costs and the moved masses are reduced.

Expediently, the aforementioned assembly interface 9 for the attachment of the end effector 10 is located on the second end section 36*c* of each guide rod 36 which by way of example points downwards. By way of example, a holder 38 which in particular functions as an adapter and via which the end effector 10 is fastened to the assembly interface 9 is assigned to the end effector 10. The fastening is effected by way of a fastening screw 41 which passes through the holder 38, is screwed into the guide rod 36 at the face side and which is only indicated symbolically.

Expediently, a holding element 43 which projects transversely in a direction pointing away from the drive zone 18 and which is used for the fixation of the fluid conduit 14 which departs upwards from the assigned metering unit 10 is fastened to the first end section 36*b* of the guide rod 36—here by way of a fastening screw 42 which is only indicated symbolically.

The guide rods 36 are preferably arranged such that the longitudinal axes 36*a* of the guide rods 36 of all working units 6 lie in a common plane which is denoted as a guide rod plane 44 and which runs orthogonally to the x-axis. The guide rod plane 44 in particular is placed such that it lies in the transition region between the working zone 17 and the drive zone 18. Preferably, the assigned guide rod 36 passes through each coupling section 26, wherein a fixed connection between the two components is created by the fastening device 27. By way of example, the fastening device 27 comprises several fastening screws, by way of which the coupling section 26 is clamped to the guide rod 36.

Preferably, all coupling sections 26 are designed in a movable manner in the manner of a slide, so that they each form a coupling slide 45 which can execute a linear movement 28 and for this purpose is guided on the system main body 4 in a linearly displaceable manner. In the course of the linear movement 28, the coupling slide 45 can be displaced between a first end position which is approached to the first carrier plate 31 and a second end position which is approached to the second carrier plate 32, wherein the coupled drive unit 6 participates in this linear movement 28.

The coupling slides 45 undergo their linear guidance on the one hand by the guide rod 36 which is connected to them and which as mentioned is linearly displaceably mounted on the two carrier plates 31, 32. The guide rod 36 is fixed on a front end section of the coupling slide 45 which faces the working zone 17.

Each coupling slide 45 undergoes an additional further linear guidance by way of example at its rear end section 46 which is away from the working zone 17. Here, the coupling sections 45 independently of one another and each with a guide projection 47 engage in a slidingly displaceable manner into a guide groove 48 of the system main body 4 which extends in the z-axis direction. The guide grooves 48 extend linearly in the z-axis direction and are arranged next to one another in the y-axis direction with a parallel alignment, wherein by way of example they are formed on the inner surface of the rear side wall 33*b*.

The position sensors 20 preferably cooperate with the coupling sections 26. Expediently, each position sensor 20 is designed in a manner in which it is sensitive to a magnetic field, wherein the assigned coupling section 26 comprises a permanent magnet for the contact-free actuation of the position sensor 20. By way of example, the position sensors 20 are fixed in fastening grooves 21 which are formed in the system main body 4, in particular in the rear side wall 33*a* at the outside.

Each coupling slide 45 is expediently designed in a plate-like manner and is aligned such that its plate plane 45*a* which is parallel to the two largest outer surfaces runs orthogonally to the y-axis. This provides the possibility which is realised by way of example, of placing the plate-like coupling slides 45 next to one another in a restricted space in a space-saving manner with plate planes 45*a* which are parallel to one another. This is well evident from the FIGS. 5 and 6.

Expediently, with regard to each drive unit 7, the longitudinal axis 24*a* of the rod-like driven body and the longitudinal axis 36*a* of the guide rod 36 extend in the plate plane 45*a* of the plate-like coupling section 45.

In particular, if with regard to the driven movement 25 of the driven body 24 it is the case of a linear movement in the z-axis direction, then the coupling section 26 and the driven body 24 can be fixedly connected to one another in an arbitrary manner and in particular also be designed in an integral manner. Both components then always herewith carry out a synchronous unitary linear movement for generating the working movement 8.

By way of example, each driven body 24 however with regard to drive is connected to the assigned coupling section 26 in a manner such that the rotational driven movement 25 is converted into the linear movement 28.

For this, at least the length section of the rod-like driven body 24 which extends in the coupling space 34 is designed in the manner of a threaded spindle, so that one can denote it is a threaded spindle section 49 of the driven body 24 which has an outer thread 52 on its outer periphery. The driven body 24 engages with the threaded spindle section 49 into an inner thread 52 of the coupling section 26. Since the inner thread 52 is formed in a non-rotatable manner on the coupling section 26 which for its part is fixed in a non-rotational manner with respect to the system main body 4, a rotational driven movement 25 of the threaded spindle section 49 creates the linear movement 28, since the inner thread 52 together with the assigned coupling section 26 move in the longitudinal direction of the threaded spindle section 49.

By way of example, the threaded engagement is realised by way of the coupling slide 45 comprising a preferably plate-like slide body 53, into which a separate spindle nut 54 which comprises the inner thread 52 is stuck. The spindle nut 54 is seated in a receiver structure 55 of the slide body 53 which by way of example is formed by a circularly cylindrical opening which passes through the solid body 53 in the y-axis direction and into which the spindle nut 54 which is provided with a complementary circularly cylindrical outer periphery is inserted. The inner thread 52 is a constituent of a threaded bore which passes diametrically through the spindle nut 54. A through-bore 56 which passes through the slide body 53 in the z-axis direction and which goes through the circularly cylindrical opening of the receiver structure 55 is aligned with the threaded bore of the spindle nut 54 and through which the assigned threaded spindle section 49 passes in a freely rotatably manner without a threaded engagement.

The slide body 53 can consist of a plastic material which is inexpensive, wherein the spindle nut 54 expediently consists of steel.

The spindle nut 54 in principle is rotatable in the receiver structure 55 with its circularly cylindrical outer periphery and is also displaceable in the y-axis direction, so that it can automatically align itself with respect to the threaded spindle section 49 which engages into it, which simplifies the assembly and reduces the wear.

Concerning an embodiment example which is not illustrated, the coupling slide 45 has a slide body 53, in which the inner thread 52 is integrally formed. Here, a threaded bore which forms the inner thread 52 passes through the slide body 53.

The stators 23 of all drive units 7 are expediently arranged in a protected manner below a cover hood 57 which is arranged in the region of the equipping surface 35. The cover hood 57 is not shown in all figures.

Figure 5:
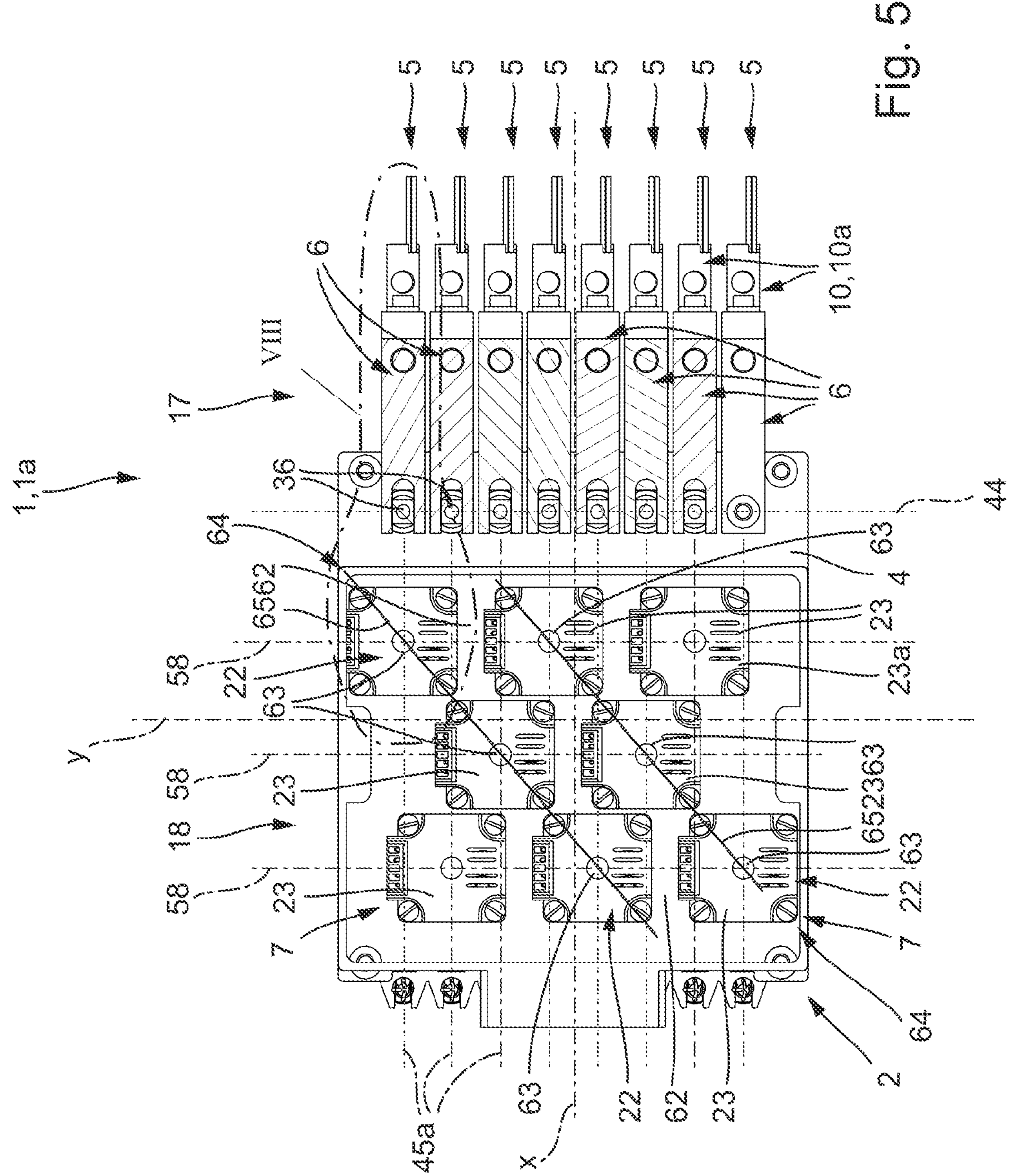
Figure 6:
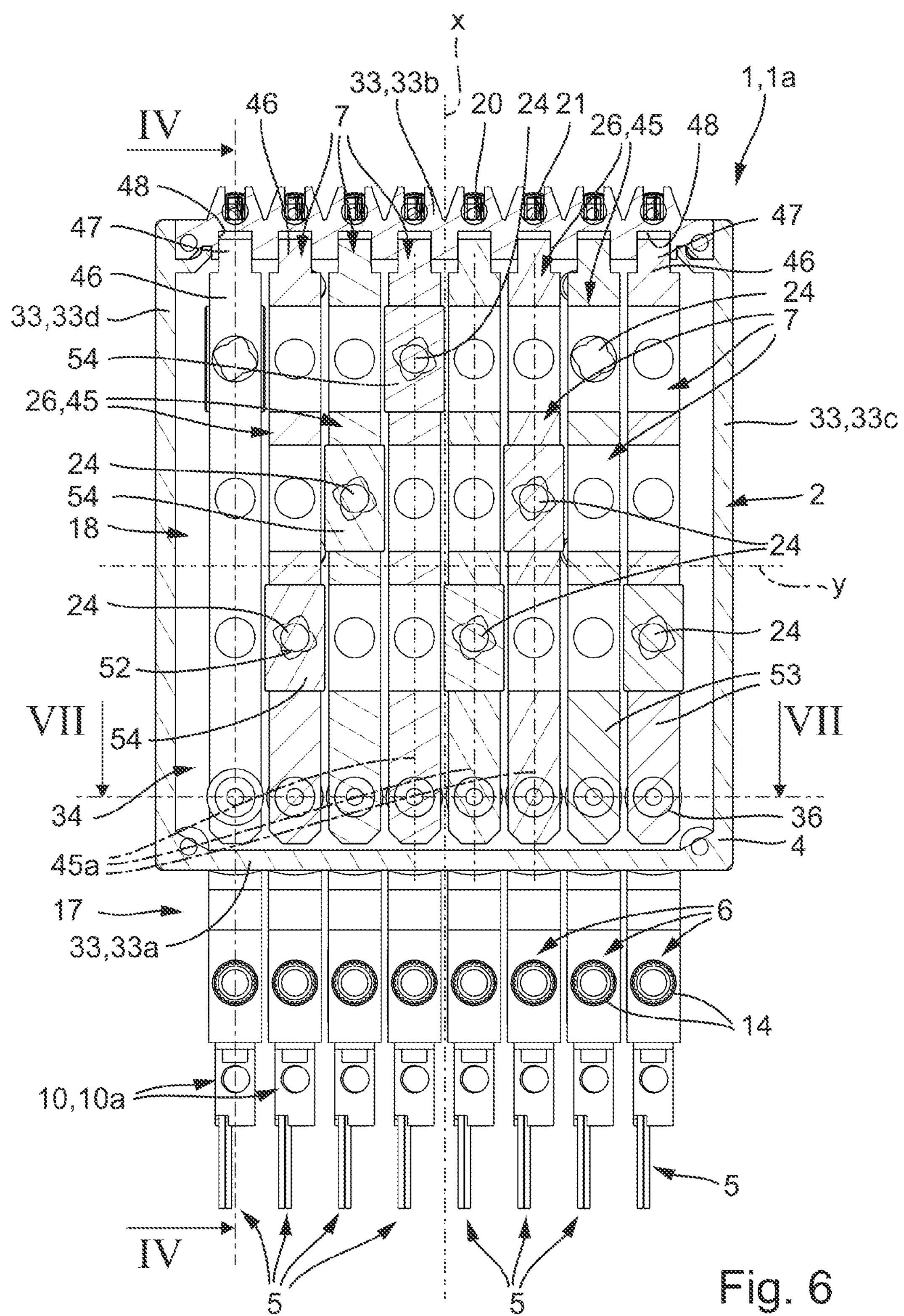
Figure 7:
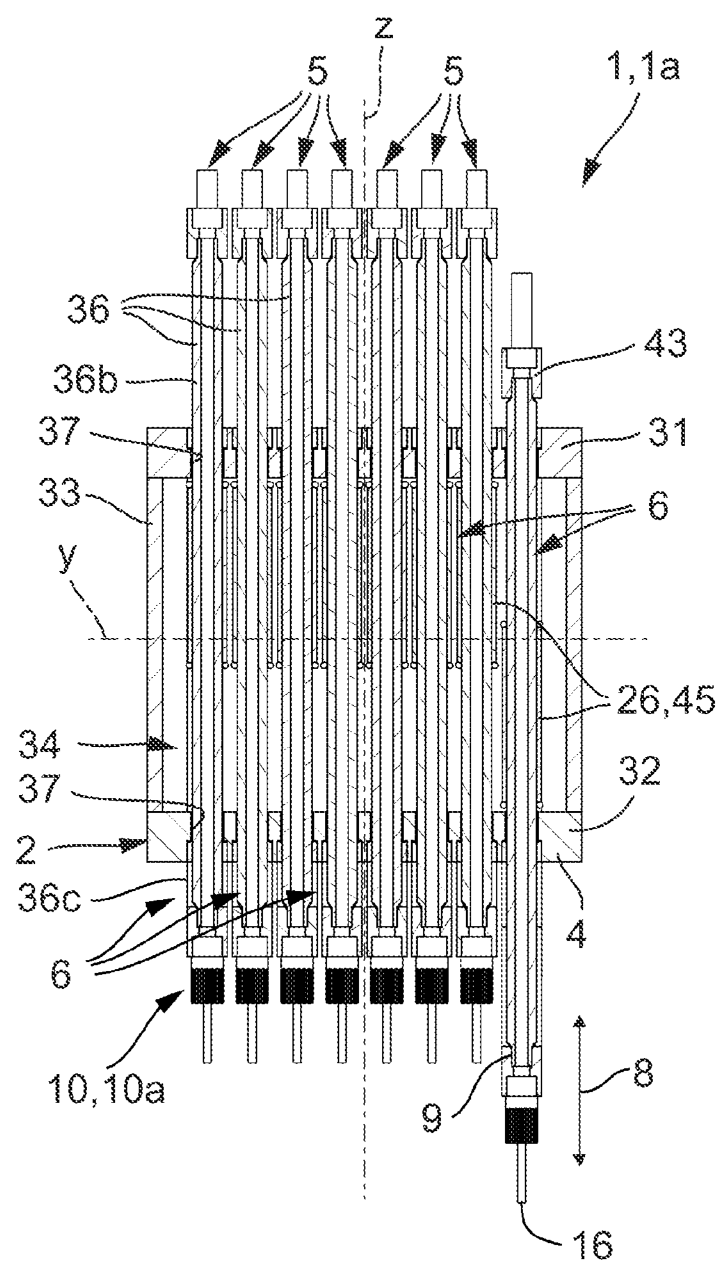

The stators 23 are arranged on the equipping surface 35 with a particularly advantageous distribution. Such can be understood particularly well by way of FIGS. 5 and 9, wherein FIG. 5 represents a plan view upon the stators 23 with a view in the z-direction The present stators 23 are arranged in several linear rows which are each denoted as a stator row 58, and extend in the y-axis direction and are arranged successively in the x-axis direction. The stator rows 58 are rendered recognisable in the drawing by dot-dashed straight lines which simultaneously define the respective row alignment.

All stators 23 are divided onto the existing several stator rows 58. According to FIG. 9, the individual stator rows 58 amongst one another can have the same number of stators 23. However, it is likewise possible to provide the stator rows 58 with a different number of stators 23, concerning which FIG. 5 provides an example.

Concerning both illustrated embodiment examples, the stators 23 are divided onto three stator rows 58. However, without further ado a larger or smaller number of stator rows 58 per system main unit 2 is also possible.

Figure 9:
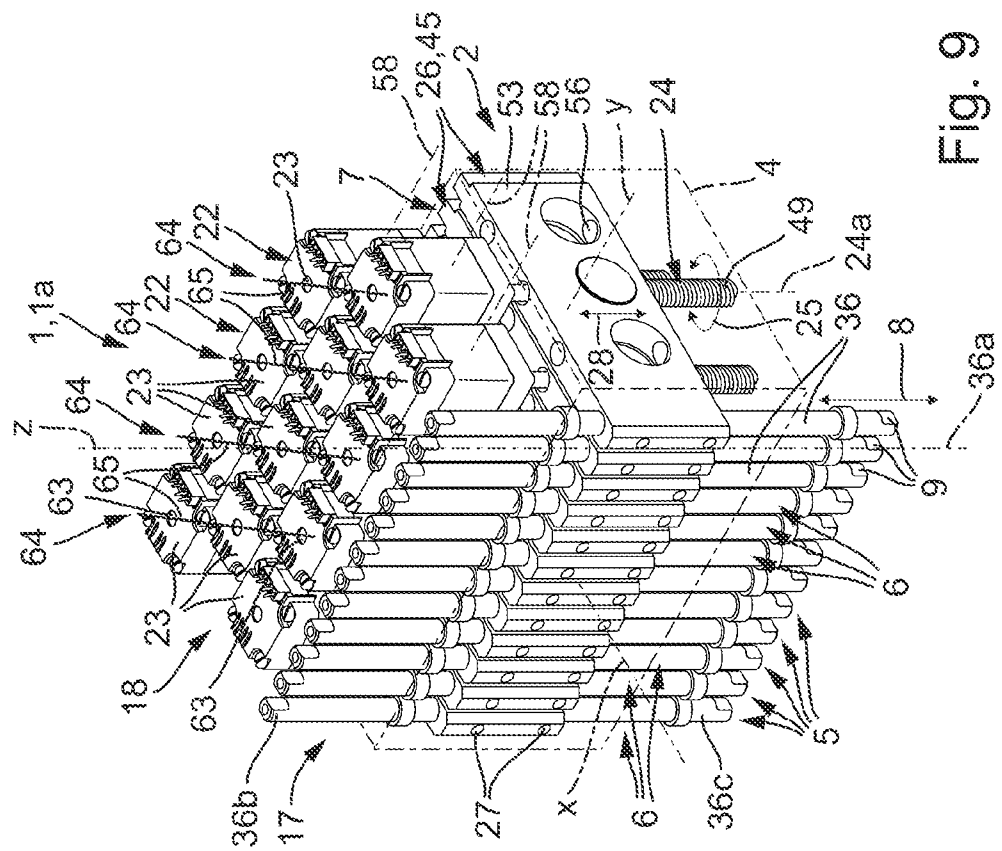

The embodiment of FIG. 9 shows a system main unit 2 which comprises twelve positioning units 5 and accordingly also twelve stators 23. These here are arranged in three stator rows 58 each with four stators 23. Concerning the embodiment example of FIGS. 1 to 8, the system main unit 2 as a whole comprises eight positioning units 5 and accordingly also eight stators 23, wherein these eight stators 23 are divided onto two stator rows 58 with three stators and a third stator row 58 with two stators 23. The stator row 58 with only two stators is expediently located between the two stator rows 58 which are each with three stators 23.

The outlined arrangement of the stators 23 which is distributed in rows results due to a correspondingly distributed arrangement of the respective drive modules 22, said drive modules each comprising one of the stators.

All stators 23 are preferably placed at the same height with respect to an axis direction of the z-axis, in a common plane which is denoted as a stator plane 61 and which extends at right angles to the z-axis.

A particularity of the stator distribution lies in the fact that the stators 23 are not arranged on a line in an flush manner in the x-direction, but that the stators 23 of the respectively adjacent stator rows 58 are arranged offset to one another in the y-axis direction, and specifically in a manner such that they mutually overlap in the y-axis direction.

When considered in the z-axis direction, all stators 23 expediently have the same outline. Preferably, it is an at least essentially square outlines, which is the case with the illustrated embodiment examples. Herein, the stators 23 are orientated such that two of its four outer surfaces which are opposite one another are each aligned parallel to the stator rows 58.

Preferably, and according to the illustrated embodiment example, stators 23 which belong to the same stator row 58 are arranged distanced to one another in the axis direction of the y-axis. By way of this, an intermediate space 62 results between two consecutively arranged stators 23 of each stator row 58. The intermediate space 62 is preferably narrower than the width of the stators 23 which is measured in the same direction.

In particular, in dependence on the base surface of the stators 23 at right angles to the z-axis, an arrangement concerning which the stators 23 bear on one another within at least one and preferably within each stator row 58 is also possible.

The stators 23 which belong to the stator rows 58 which are successive in the x-axis direction are expediently arranged at a certain distance to one another in the x-direction, wherein this distance in particular is lower than the distance between the stators 23 which belong to the respectively same stator row 58.

Each stator 23 has a centre region 63 when considered in the z-axis direction. This centre region 63 expediently lies on the longitudinal axis of the driven body 24 which is assigned to the respective stator 23. A particularly advantageous distribution of the stators 23 in the stator plane 61 envisages the resulting of several stator groups 64 which are each composed of several stators 23 which belong to stator rows 58 which are consecutive in the direction of the x-axis, and whose centre regions 63 lie at least essentially on an imaginary connection straight line 65 which is inclined with respect to the x-axis. The connection straight lines 65 of the several stator groups 64 lie parallel to one another. The inclination of the connection straight lines 65 of 45 degrees with respect to the x-axis and which is realised with the embodiment examples is particularly advantageous.

Concerning the embodiment example of FIGS. 1 to 8, two stator groups 64 which are each composed of three stators 23 and which have the aforementioned particularities are present. Concerning the embodiment example of FIG. 9, four such stator groups 64 result, of which three in total have three stators and a fourth stator group 64 consists of two stators 23.

Disregarding those stators 23 which lie on a common connection straight line 65 whilst forming a stator group 64, at least one further stator 23 can yet also be present, such not belonging to such type of stator group 64.

Expediently, each stator row 58 comprises at least one stator 23 which in the y-axis direction overlaps with two stators 23 of at least one stator row 58 which is adjacent in the x-direction. It is to be understood that one or more stator rows 58 can comprise at least one stator 23 which lies at the end of the stator row 58 and which with only one stator 23 overlaps at least one adjacent stator row 58.

On account of the above-explained arrangement or distribution of stators 23 and of drive modules 22 which contain the stators 23, the system main unit 2 can be realised in the drive zone 18 with small dimensions in the y-axis direction, although individual stators 23 have a greater width than each of the working units 6.

The working units 6 are narrower than the individual stators 23 in the y-axis direction. Added to this is the fact that expediently each length section of each driven body 24 which extends outside the stator 23 as well as each coupling section 26 have a smaller width in the y-axis direction than the associated stator 23.

In this manner, in a projection onto a plane which is at right angles to the z-axis according to FIG. 5, there remains sufficient space between the coupling sections 26 of those drive units 7 whose stators lie in the same stator row 58, for those coupling sections 26 which belong to those drive units 6 whose stators 23 are arranged in each subsequently stator row 58 to engage past.

If one considers the frontmost stator row 58 which lies closest to the working zones 17, then the coupling sections 26 which belong to their stators 23 amongst one another have a distance in the y-axis direction which is dimensioned adequately large, so that the coupling sections which are assigned to the stators 23 of the subsequent stator row 58 extend therebetween. The mutual distances by way of example are so large than the coupling sections 26 which are assigned to each further stator row 58 can also engage through.

Since the coupling sections 26 are arranged at a distance in front of the stators 23 in the z-axis direction, by way of example therefore to the bottom, they can extend pass the individual stators 23 in the x-axis direction without further ado.

Preferably, within the individual stator rows 58, the distance measured in the y-axis direction between the centre regions 63 of stators 23 which are directly adjacent in each case is at least a multiple of the width of the coupling sections 26 which is measured in the y-axis direction, wherein concerning the aforementioned multiple, this is the number of stator rows which are present in total. If therefore as with the embodiment example in total three stator rows 58 are present, the distance between the centre regions 63 of the respectively adjacent stators 23 within each stator row 58 is at least triple the width of the coupling sections 26. For the benefit of a compact construction width of the system base unit 2, one would expediently select the distance such that the coupling sections 26 which extend therebetween either bear on one another in a slidingly displaceable manner or are arranged only at a small distance to one another.

In principle, the shorter the coupling sections 26, the closer do the assigned drive modules 22 or their stators 23 lie to the working zone 17, since then the distance between the driven body 24 and the assigned guide rod 36 is correspondingly smaller.

Nevertheless, it is seen as being advantageous if according to the embodiment examples, all coupling sections 26 have the same length in the x-axis direction, which provides the advantage of all coupling sections 26 being able to be guided in a linearly displaceable manner on the rear side wall 33*b*.

Furthermore this provides the advantageous possibility of designing the coupling sections 26 as coupling slides 45 with slide bodies 53 which are identical amongst one another. This applies to the illustrated embodiment examples.

In order, irrespective of the design identity of the slide bodies 53, for a drive coupling to the driven bodies 24 which are placed differently distanced to the working zone 17, expediently each slide body 53 is provided with a number of receiver structures 55 which corresponds to the number of stator rows 58, the distance of said receiver structures to one another measured in the x-axis direction corresponding to the mutual distance between the stator rows 58. Of these several receiver structures 55 it is then only that one which is equipped with a spindle nut 54 which is assigned to one of the driven bodies 24.

Alternatively, each coupling section 26 could also be provided with a number of inner threads 52 which corresponds to the number of present stator rows 28, of which inner threads at the same time in each case only one is used for a threaded engagement with a threaded spindle section 49.

If the drive modules 22 are designed as rotation drives, which is the case given the use of electric motors, then a further already mentioned driven shaft 66 extends in the inside of the stator 23, said driven shaft representing a length section of the driven body 24 and being coupled to the threaded spindle section 49 in a rotationally fixed manner. The driven shaft 66 and the threaded spindle section 49 can be designed as one piece or also as separate components which are fixedly connected to one another.

The invention claimed is:

1. A positioning system for positioning end effectors, within a system main body, on which a plurality of working units are arranged next to one another in the axis direction of the y-axis of an x-y-z coordinate system, said plurality of working units carrying out a working movement and being linearly movable in the axis direction of a z- axis which is orthogonal to the y-axis for the positioning of an end effector which is respectively arranged on them, each of the plurality of working units are configured to execute their working movements independently of one another and relative to the system main body, wherein each working unit comprises a movable guide rod which is aligned in the axis direction of the z-axis, is fastened to a coupling section and is linearly displaceably mounted on the system main body and on which an assembly interface is formed for the attachment of the end effector, wherein an individual drive unit is assigned to each of the plurality of working units for generating its working movement, wherein the drive units are arranged next to one another in the axis direction of the y-axis, and wherein each of the individual drive units comprise, a stator which is stationary with respect to the system main body and a driven body which is actively moveable with respect to the stator upon carrying out the driven movement, wherein the driven body with regard to drive is coupled to the assigned working unit via the coupling section for creating the working movement, and wherein each of the stators are arranged in a distributed manner in several a plurality of stator rows which are successive in the axis direction of the x-axis and are aligned in the axis direction of the y-axis, wherein the stators of the stator rows which are respectively adjacent in the axis direction of the x-axis are arranged offset to one another in the axis direction of the y-axis with a mutual overlapping, and wherein each drive unit comprises an individual drive module which comprises the stator and the driven body.

2. The positioning system according to claim 1, wherein the positioning system is designed as a metering system, wherein the end effectors are each a metering unit for the metered receiving and/or delivery of a fluid quantity.

3. The positioning system according to claim 1, wherein each of the drive units are arranged in a drive zone which is adjacent to the working units in the axis direction of the x-axis.

4. The positioning system according to claim 1, the coupling section of each of the drive units are arranged distanced to the associated stator in the axis direction of the z-axis and each measured in the same axis direction of the y-axis of the working units, have a smaller width than the associated stator.

5. The positioning system according to claim 1, wherein each of the stators which belong to the same stator row are arranged distanced to one another in the axis direction of the y-axis.

6. The positioning system according to claim 1, each of the stators of the drive units are arranged in at least three stator rows which are consecutive in the axis direction of the x-axis.

7. The positioning system according to claim 1, wherein all of the plurality of stators are placed at the same height in the axis direction of the z-axis in a common stator plane which is orthogonal to the z-axis.

8. The positioning system according to claim 1, wherein each of the stators are arranged distributed in a manner in the axis direction of the z-axis a plurality of stator groups result, each of said stator groups each being composed of the plurality of stators which belong to the stator rows which are consecutive in the axis direction of the x-axis, and whose center regions lie at least essentially on an imaginary connection straight line which is inclined with respect to the x-axis, wherein the connection straight lines the plurality of stator groups run parallel to one another.

9. The positioning system according to claim 1, wherein the plurality of stators considered in the axis direction of the z-axis have an essentially square outline.

10. The positioning system according to claim 1, wherein each coupling section comprises a coupling slide which is displaceably mounted on the system main body in the axis direction of the z-axis.

11. The positioning system according to claim 1, wherein the longitudinal axis of each of the plurality of guide rods extend in a common guide rod plane which is orthogonal to the x-axis.

12. The positioning system according to claim 1, wherein the system main body comprises two carrier plates which each extend in a plane which is orthogonal to the z-axis and are distanced to one another in the axis direction of the z-axis and delimiting a coupling space which receives the coupling section, wherein each of the plurality of guide rod bridges the distance between the two carrier plates and is linearly displaceably mounted in both carrier plates.

13. The positioning unit according to claim 1, wherein each of the drive units are electrical drive units and each drive module is a stepper motor.

14. The positioning system according to claim 1, wherein the driven body of each drive unit is designed in a rod-like manner and is aligned such that its longitudinal axis extends in the axis direction of the z-axis.

15. The positioning system according to claim 14, wherein the driven body of each drive unit is configured to be driven into a rotational driven movement about its longitudinal axis and is in threaded engagement with the assigned coupling section in a manner such that the rotational driven movement of the driven body creates a linear movement of the coupling section which is orientated in the axis direction of the z-axis, from which linear movement in turn the linear working movement of the working unit which is connected to the coupling section.

16. The positioning system according to claim 15, wherein the coupling section of each drive unit comprises several receiver structures which are distanced to one another in the axis direction of the x-axis, for the selective receiving of a spindle nut, with which a threaded spindle section of the assigned driven body is in threaded engagement.

* * * * *